2,789,940
11 BETA HYDROXYLATION OF STEROIDS BY BOTRYTIS CINEREA

Louis I. Feldman, Hillcrest, and William Shardlow Allen, Pearl River, N. Y., assignors to American Cyanamid Company, New York, N. Y., a corporation of Maine No Drawing. Application June 16, 1955,
Serial No. 516,046

6 Claims. (Cl. 195—51)

This invention relates to the oxidation of steroids, especially to the introduction of an hydroxyl group at the 11-position in the $\beta$-configuration. In particular, the invention is concerned with Kendall's Compound F (hydrocortisone, $\Delta^4$-pregnene-11$\beta$,17$\alpha$,21-triol-3,20-dione).

Recently, a number of steroids having an hydroxyl group at the 11-position have become important therapeutic agents in the treatment of diseases. Among these steroids is Kendall's Compound F. Processes of producing this substance from 11-desoxy steroids have been developed, but unfortunately suitable intermediates are scarce, and the processes of introducing an hydroxyl group at the 11-position are unsatisfactory for various reasons. The present invention provides an efficient means of introducing an hydroxyl group at the 11-position of Reichstein's Substance S to produce Compound F.

Reichstein's Substance S, which is $\Delta^4$-pregnene-17$\alpha$,21-diol-3,20-dione, is a commercially available product made from diosgenin, the original source of which is various species of Mexican yams of the family Dioscoreaceae. The process of the present invention is believed to represent an advance over prior methods of oxidizing steroids at the 11-position because of its freedom from side reactions and high yields. It appears that the process of the present invention yields primarily the desired steroid product, which can be readily recovered by extraction processes such as will be described hereinafter.

The process of the present invention is a fermentative oxidation using organisms of the class *Fungi imperfecti*, which in general reproduce asexually. The genus Botrytis is useful in the present process. Several isolates of Botrytis species of the *cinerea* type [*Botrytis cinerea* (ATCC 7020)] have been classified also as *Sclerotinia fuckeliana*—Mycologia 45, p. 422 (1953). Several other Botrytis species have also been classified as Sclerotinia.

In carrying out the process of the present invention, a fungus of the Botrytis genus, such as *Botrytis cinerea*, *Botrytis peoniae*, and/or other Botrytis species, is cultivated aerobically in a suitable nutrient medium and allowed to act upon Substance S or an ester thereof, such as acetate, or a related 11-desoxy steroid. During growth of the organism under favorable conditions, an hydroxyl group is introduced into the 11-position. The exact mechanism of this oxidation is obscure, but it is the result of enzymes produced by the organism as it grows. A suitable nutrient medium contains a soluble source of carbon, nitrogen, and mineral elements. Sources of carbon include corn starch, molasses, maltose, dextrose, sucrose, xylose, galactose, glycerol, mannitol, and various organic acids, such as citric acid, malic acid, acetic acid, and various natural products containing carbohydrates, such as corn steep liquor, soybean meal, cotton seed meal, and many other available materials which have been used heretofore as a source of carbon in fermentation processes. Usually, a variety of the above can be employed in the medium with good results.

Suitable sources of nitrogen include some of the above-named materials, such as corn steep liquor, soybean meal, cotton seed meal, and the like, and various other substances, such as beef extract, casein, yeast, enzymatically digested proteins, and degradation products, including peptones, amino acids, and many other available proteinaceous materials which have been found suitable in fermentation processes for the support of growth of fungi. Various inorganic sources of nitrogen, including urea, ammonium salts, nitrates, and the like, may also be included in the medium as a source of assimilable nitrogen to provide a favorable growth substrate for the organism.

Ordinarily, much of the mineral requirements of the fermentation are present in the crude materials that are used to furnish sources of carbon and nitrogen or occur in the water that is used in the process. Generally, however, it is advisable to supplement the minerals normally present with added amounts to obtain a maximum growth of the fungus. Cations and anions which may be desirable in added amounts include the phosphate, sulphate, chloride, sodium, potassium, magnesium, iron, calcium, cobalt, manganese, and various others. Inasmuch as the use of mineral elements in supporting the growth of fungi is fairly well understood, elaboration appears to be unnecessary.

The 11-desoxy steroid may be added to the medium prior to, or one or two days after, inoculation. The fermentation is then continued for a period of 1-4 days or more to effect oxidation of the steroid.

To prepare inocula, 5-10 ml. of sterile water is used to suspend the surface growth of an agar test tube slant of the culture. The resulting suspension of spores and mycelium is used to inoculate two to three 100-ml. lots of sterile medium in 500-ml. Erlenmeyer flasks, as shown in the examples hereinafter. After inoculation, such flasks are incubated on a reciprocating shaker at 21° C. for about 2 to 4 days. The contents of 2 or 3 such flasks are used to inoculate 12 liters of sterile medium in a 20-liter bottle.

Fungi of the Botrytis genus grow at all temperatures between 5-30° C., and it is possible to carry out the oxidation process within these ranges. Temperatures between about 15-28° C. are preferred, with reaction usually carried out at about 20° C.

During the fermentation process aeration is provided by forcing sterile air through the medium at a rate approximating 1/3 to 2 volumes of air per volume of medium per minute. Mechanical agitation is used to keep the mycelium and other insoluble materials in suspension. Anti-foaming agents, such as silicones, glyceride oils, and the like, may be added from time to time and in amounts as needed.

The steroid to be oxidized is added to the fermentation in solution or in finely divided form. A preferred method is to dissolve a steroid in methanol or other water-miscible solvents and add it to the fermentation medium at the desired stage of the process. Although the steroid may precipitate from solution when so added, it is dispersed throughout the medium as a fine suspension and becomes readily available to the organism for oxidation. The amount of steroid added to the fermentation may vary considerably, but it is generally of the order of $\frac{1}{10}$-1 gram per liter of medium.

At the conclusion of the fermentation process, the desired 11-hydroxylated steroid is recovered from the fermentation medium by the following procedure, which describes in particular a 10 ml. fermentation. This is a general procedure and is operative for fermentations of various sizes.

Acetone (100-150 ml.) is added to 10 ml. of fermented beer, and the mixture is allowed to stand at room temperature for a while and then filtered. The filtrate is concentrated under reduced pressure until no acetone remains (aqueous volume, 10-15 ml.). The aqueous residue is transferred to a separatory funnel, and about 100 ml. of water is added. The aqueous solution is then extracted 4 times with 20 ml. portions of methylene chloride. The 4 extracts are pooled, and the resulting solution is washed once with 2% aqueous sodium bicarbonate saturated with sodium chloride and then twice with about 50 ml. portions of saturated sodium chloride solution. The washed methylene chloride solution is dried over anhydrous magnesium sulfate and filtered. The filtrate is concentrated on a steam-bath at atmospheric pressure to 3–5 ml., and the concentrate is transferred to a 10 ml. volumetric flask and brought up to volume with methylene chloride. This solution is used for characterization of steroid content as described hereinafter.

In larger scale fermentations, the crude product or products may be recovered from the fermentation beer by simple solvent extraction, using a suitable water-immiscible solvent, such as chlorinated lower hydrocarbons, alcohols, esters, ketones, etc. Further purification and separation of steroid products from extracts may be accomplished by methods well understood by those skilled in the art. Separation of steroid mixtures often requires the use of chromatography.

The process employed to identify the steroids present in the extracted fermentation beer described above is by paper strip chromatography. The solvent system used is water-methanol-benzene prepared by shaking of approximately 50% water–50% methanol with benzene in a separatory funnel, and then allowing the two layers to separate. A portion of the lower layer is placed in an open dish on the floor of a large glass cylinder. The upper layer is the mobile phase and is used to fill the trough-shaped well within the cylinder. A standard steroid solution is prepared by dissolving 10 mg. of each of the following steroids in 10 ml. of methylene chloride:

Reichstein's Substance S
Cortisone
Hydrocortisone
11-epi-hydrocortisone
(Other steroids can be included in the standard solution when appropriate)

At least one standard steroid solution is chromatographed simultaneously each time an unknown solution is tested. Exactly 0.025 ml. of the standard steroid solution is applied to the paper strip at the starting line, 4 inches from the upper end of the strip, which is folded over the edge of the trough and immersed in the mobile phase within. The strip is then developed for 2–4 hours at 37° C. Similarly, 0.1 ml. of the unknown solution is applied to another strip which is then folded into the same trough and developed with the steroid standard strip. The trough permits development of many strips simultaneously. After proper development of the paper strips, they are removed from the apparatus and air-dried. After drying, the strips are sprayed with an alkaline solution of Blue Tetrazolium, which generates color with steroids which contain a ketol side-chain. Color-developed strips are alined with at least one "standard" strip and evaluated. The different steroids can be identified by their positions on the strips.

The specific examples which follow illustrate in detail the oxidation of Reichstein's Substance S and purification of the resulting hydrocortisone.

*Example 1*

| | Percent |
|---|---|
| Corn steep liquor | 1.25 |
| Mannitol | 1.0 |
| (NH4)2HPO4 | 0.2 |
| KH2PO4 | 0.15 |
| KH2PO4 | 0.05 |
| MgSO4·7H2O | 0.025 |
| NaCl | 0.2 |
| Wisconsin A-Z salts solution | 0.1 |
| Water to volume. | |
| pH 6.5–7.0. | |

Twelve liters of the above medium containing three grams of Reichstein's Substance S, sterilized in a 20-liter bottle was inoculated with 200 ml. of a 3-day mycelial growth of *Botrytis cinerea* (Lederle Culture No. N–51). The fermentation was carried out at 28° C. for 240 hours, after which time paper strip analyses indicated a conversion to hydrocortisone of about 20%.

The resultant fermentation mixture was filtered and the mycelium washed with 2 liters of acetone. This extract was combined with the beer and the acetone evaporated under reduced pressure. The beer was then extracted with 4 successive 2 liter volumes of methylene chloride; the extracts were combined and washed 2 times with saturated saline. After drying over anhydrous sodium sulfate, the extract was evaporated under reduced pressure, yielding 4 g. of an oily residue.

The residue was then dissolved in a portion of the solvent phase from the system: ethyl acetate, 4; petroleum ether (boiling point 90–100°), 2; methanol, 3; water, 2; and partitioned on a column consisting of 220 g. of diatomaceous earth and 110 g. of the water phase from the above system. The eluted fractions containing the desired steroid were combined and evaporated to dryness under reduced pressure. Crystallization of the residue from acetone-petroleum ether (60–70°) gave crystals melting at 213–216° C., $[\alpha]_D^{24} + 162°$ (ethanol); ultraviolet spectrum:

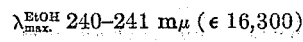

$$\lambda_{max}^{EtOH}\ 240\text{–}241\ m\mu\ (\epsilon\ 16{,}300)$$

The infrared absorption spectrum was identical to that of an authentic sample of $\Delta^4$-pregnene-11-beta-17-alpha-21-triol-3,20-dione (hydrocortisone).

*Example 2*

100 ml. of medium as described above in Example 1 in a 500-ml. Erlenmeyer flask was inoculated with 1 ml. of a spore suspension of *Botrytis cinerea* (Lederle Culture No. N–51) grown on TSA agar. [TSA agar is made up of 3% trypticase soy broth, (Baltimore Biological Laboratory), 5% glycerine, 0.3% beef extract, and 1.5% agar.] After 58 hours' shaking at 28° C., one ml. of this inoculum was used to inoculate 100 ml. shaker tubes containing 10 ml. of sterile medium, as in Example 1, and 2 mg. of Reichstein's Substance S. One tube was incubated for 96 hours, and after that time paper chromatographs indicated the presence of about 1 mg. of hydrocortisone (a yield of 50%).

*Example 3*

| | Percent |
|---|---|
| Cerelose | 1.0 |
| Yeast extract | 0.1 |
| NaCl | 0.25 |
| Beef extract | 0.4 |
| Peptone | 0.4 |
| pH adjusted to pH 7 with NaOH. | |

Twelve liters of the above medium in a 20 liter bottle equipped with a stirrer and an aerator was inoculated with 300 ml. of a 3-day old mycelial growth of *Botrytis cinerea* (Lederle Culture No. N–51–61). The fermentation was carried out at 21° C. Three grams of Reichstein's Substance S were added to the bottle prior to autoclaving. The fermentation was followed periodically by paper strip assay, and the bottle harvested at 72 hours, when the assay showed practically complete conversion of the Reichstein's Substance S.

Following a work-up as described in Example 1, 7.92 g. of a gummy residue was obtained. This residue was partitioned on diatomaceous earth using the system: ethyl acetate, 3; petroleum ether, 2; methanol, 3; water, 2; to give 2.2 g. of a crystalline solid. Rechromatography of this solid on the same partition system separated the desired steroid, 1.043 g., melting in the range between 200° and 216.5° C. (33.3% yield). Crystallization from acetone-petroleum ether gave pure Compound F, melting point 217–218° C. The infrared spectrum was identical to that of an authentic sample.

*Example 4*

In a further experiment under comparable conditions as described in Example 2, using the medium of Example 3, Reichstein's Substance S acetate was substituted for Reichstein's Substance S, and gave a similar yield of hydrocortisone, as indicated by chromatographic analysis. *Botrytis cinerea* (Lederle Culture No. N–51–61) was employed as the microorganism and the fermentation was carried out at 21° C.

*Example 5*

In a further experiment under conditions similar to those used in Example 4, several isolates to *Botrytis cinerea, Botrytis peoniae* and three other Botrytis species converted Reichstein's Substance S into hydrocortisone as shown by chromatographic analysis.

We claim:

1. A process which comprises the step of subjecting a member of the group consisting of Reichstein's Substance S and esters thereof to the oxidative fermentative action of *Botrytis cinerea* and recovering therefrom hydrocortisone.

2. A process which comprises the step of subjecting Reichstein's Substance S to the oxidative fermentative action of *Botrytis cinerea* and recovering therefrom hydrocortisone.

3. A process which comprises the step of subjecting Reichstein's Substance S to the enzymatic action of the fungus *Botrytis cinerea* and recovering therefrom hydrocortisone.

4. A process which comprises the steps of inoculating a nutrient medium containing assimilable carbon, nitrogen, and mineral salts and Reichstein's Substance S with the fungus *Botrytis cinerea,* and permitting the fermentation to proceed until a substantial amount of the Substance S has been oxidized at the 11-position to hydrocortisone.

5. A process which comprises the steps of inoculating a nutrient medium containing assimilable carbon, nitrogen, and mineral salts and the acetate of Reichstein's Substance S with the fungus *Botrytis cinerea,* and permitting the fermentation to proceed until a substantial amount of the Substance S has been oxidized at the 11-position to hydrocortisone.

6. A process of oxidizing a steroid selected from the group consisting of Reichstein's Substance S and esters thereof which comprises the step of subjecting said steroid to the oxidative fermentation action of *Botrytis cinerea* and recovering the 11-beta-hydroxylated steroid therefrom.

References Cited in the file of this patent

UNITED STATES PATENTS 2,602,769     Murray _____ July 8, 1952